United States Patent [19]

Henderson et al.

[11] 4,261,257

[45] Apr. 14, 1981

[54] TOASTING APPARATUS

[75] Inventors: Frederick W. Henderson; Albert R. Moore, both of Miami, Fla.

[73] Assignee: The Pillsbury Company, Minneapolis, Minn.

[21] Appl. No.: 61,329

[22] Filed: Jul. 27, 1979

[51] Int. Cl.³ .................. A47J 37/08; A47J 37/00
[52] U.S. Cl. .................................. 99/386; 99/349; 99/423
[58] Field of Search ............... 99/386, 385, 423, 443 C, 99/537, 567, 349, 403, 404; 126/22, 299 C; 426/466, 495, 505, 518, 523

[56] References Cited

U.S. PATENT DOCUMENTS

| | | | |
|---|---|---|---|
| 1,297,848 | 3/1919 | Hill | 99/386 |
| 2,565,174 | 8/1951 | Fredenhagen et al. | 99/386 |
| 2,690,496 | 9/1954 | Soprano | 99/385 UX |
| 3,517,605 | 6/1970 | Hursch et al. | 99/386 UX |
| 3,646,880 | 3/1972 | Norris | 99/386 X |
| 3,712,207 | 1/1973 | McGinley et al. | 99/423 X |
| 4,189,631 | 2/1980 | Baker et al. | 99/386 X |

Primary Examiner—Harvey C. Hornsby
Attorney, Agent, or Firm—Robert J. Lewis; Michael D. Ellwein; Mart C. Matthews

[57] ABSTRACT

A toasting apparatus includes a housing in which is mounted a heating platen having two opposed heating surfaces. Conveying means are positioned on each side of the heating platen with each conveying means being spaced from a respective heating surface defining respective paths for travel of a bun half. Positioned at one end of the heating platen and the conveying means are two discharges for discharging a bun half from a respective path. At the other end of the platen there is provided a feed opening which is adapted to receive separated bun halves with each bun half being fed to a respective path with the inside face of each bun half being adjacent a respective heating surface for toasting. The conveying means conveys the bun halves from the feed end to the discharge end. The bun halves are discharged such that the inside faces of the bun face one another for facilitating assembly of a sandwich or the like.

5 Claims, 4 Drawing Figures

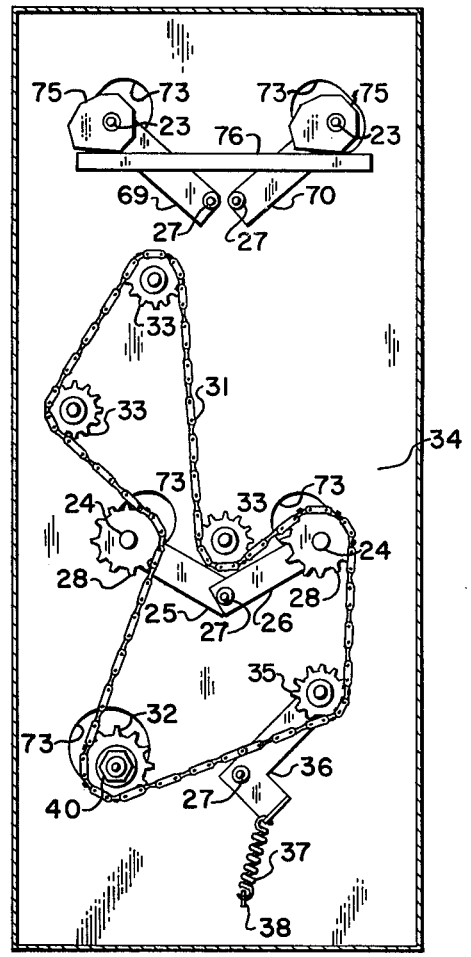
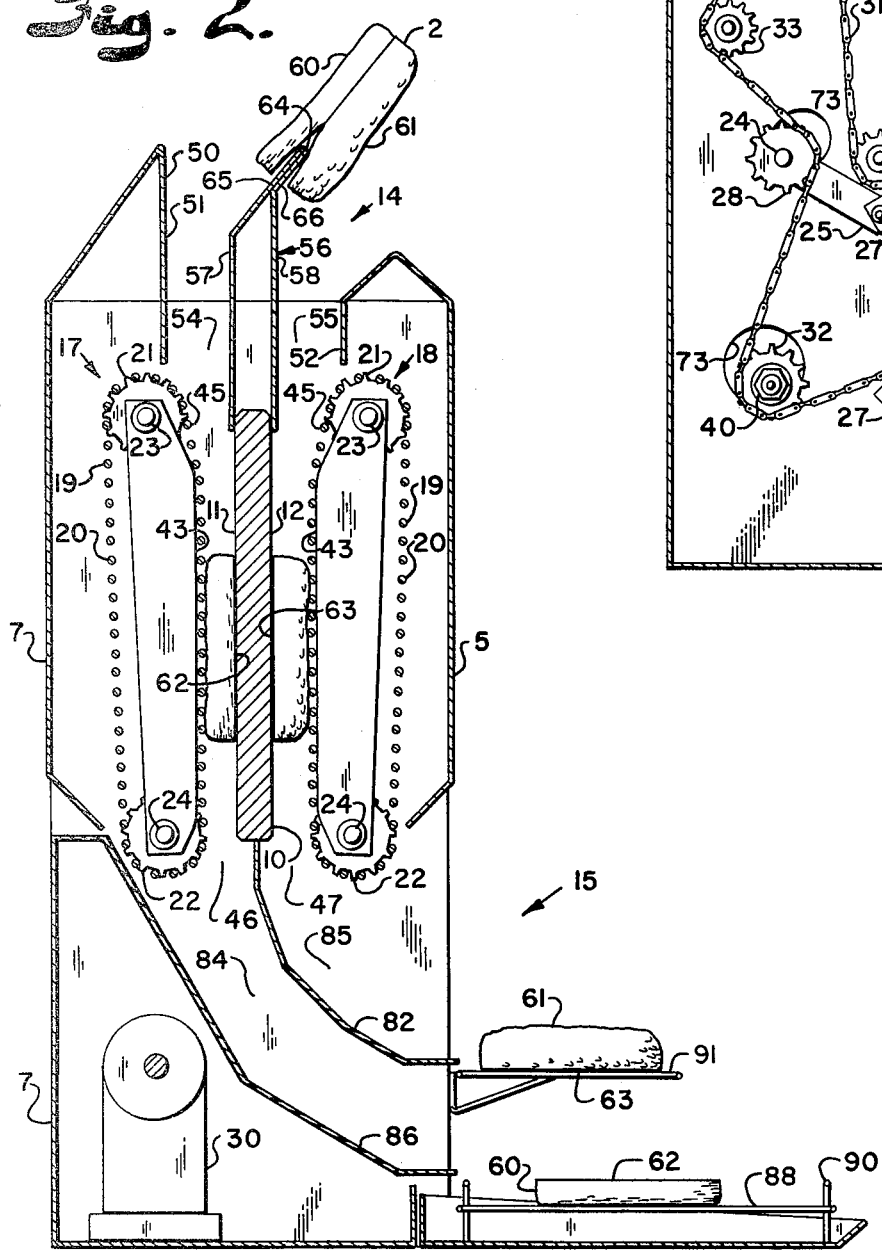

TOASTING APPARATUS

FIELD OF THE INVENTION

The present invention relates to a bun grill or toaster which is operable for simultaneously grilling the inside faces of a bun or the like.

BACKGROUND OF THE INVENTION

In the food industry it is well known that it is desirable to toast or brown surfaces of bread products before the bread product is to be consumed. This is of particular importance in the production of sandwiches such as hamburgers and the like since toasted surfaces are desired by consumers.

The art is replete with apparatuses used for toasting of bread products such as buns, sliced bread, muffins, etc. These devices have been somewhat effective in their operation but do have certain shortcomings.

With the advent of the fast-food restaurants, time savings and operator efficiency have become increasingly important. This is primarily due to the competitive nature of the fast-food restaurant business. The ability to save a few seconds, a second, or even a fraction of a second per unit of food served is becoming increasingly critical in order for a restaurant to remain competitive and still maintain a reasonable profit margin. When one figures a time saving of even a small period of time, for example, a second or less per unit of food served times the number of units served, a substantial savings in man hours or labor can be achieved. This permits more time for workers to spend with customers or to do other jobs or can reduce the number of employees necessary to efficiently operate the business.

The concern for efficiency is readily apparent from the references which are directed to providing time saving devices which will provide uniform product quality. This is the same goal of the present invention.

The main problem with apparatuses currently available for use is that several steps are required of an operator in order to achieve the finished product, i.e., an assembled sandwich. The present invention overcomes this problem by providing an apparatus which minimizes the time, effort and number of movements required of an operator to assemble a sandwich or the like. The present invention provides an apparatus which by one motion of the operator will allow insertion of a bun in separated parts into an area for toasting and will deliver the thus toasted bun halves oriented in a manner which will require a minimum amount of time, effort and movements of the operator to assemble the sandwich.

An object of the present invention is to provide an apparatus which requires a minimum amount of time, effort and movements by an operator to achieve toasting of a bun and having the bun oriented for easy assembly of a sandwich. Another object of the present invention is to provide an apparatus which will produce uniform product. A still further object of the present invention is to provide an apparatus which can accommodate different types of bread products without structural changes to the apparatus. Another object of the present invention is to provide an apparatus which can be easily adjusted to accommodate different types or thicknesses of bread product to be toasted. A still further object of the present invention is to provide an apparatus which is simple to operate, economical to maintain and build, and well adapted for its intended use.

Other objects and advantages of the present invention will become apparent from the following detailed description taken in connection with the accompanying drawings wherein are set forth by way of illustration and example certain embodiments of this invention.

FIG. 2 is a sectional view of the apparatus taken along the line 2—2 FIG. 1 showing structural details of the apparatus.

FIG. 3 is a sectional view of the apparatus taken along the line 3—3 FIG. 1 showing details of an adjusting mechanism and drive mechanism.

DESCRIPTION OF THE INVENTON

Figure 1:
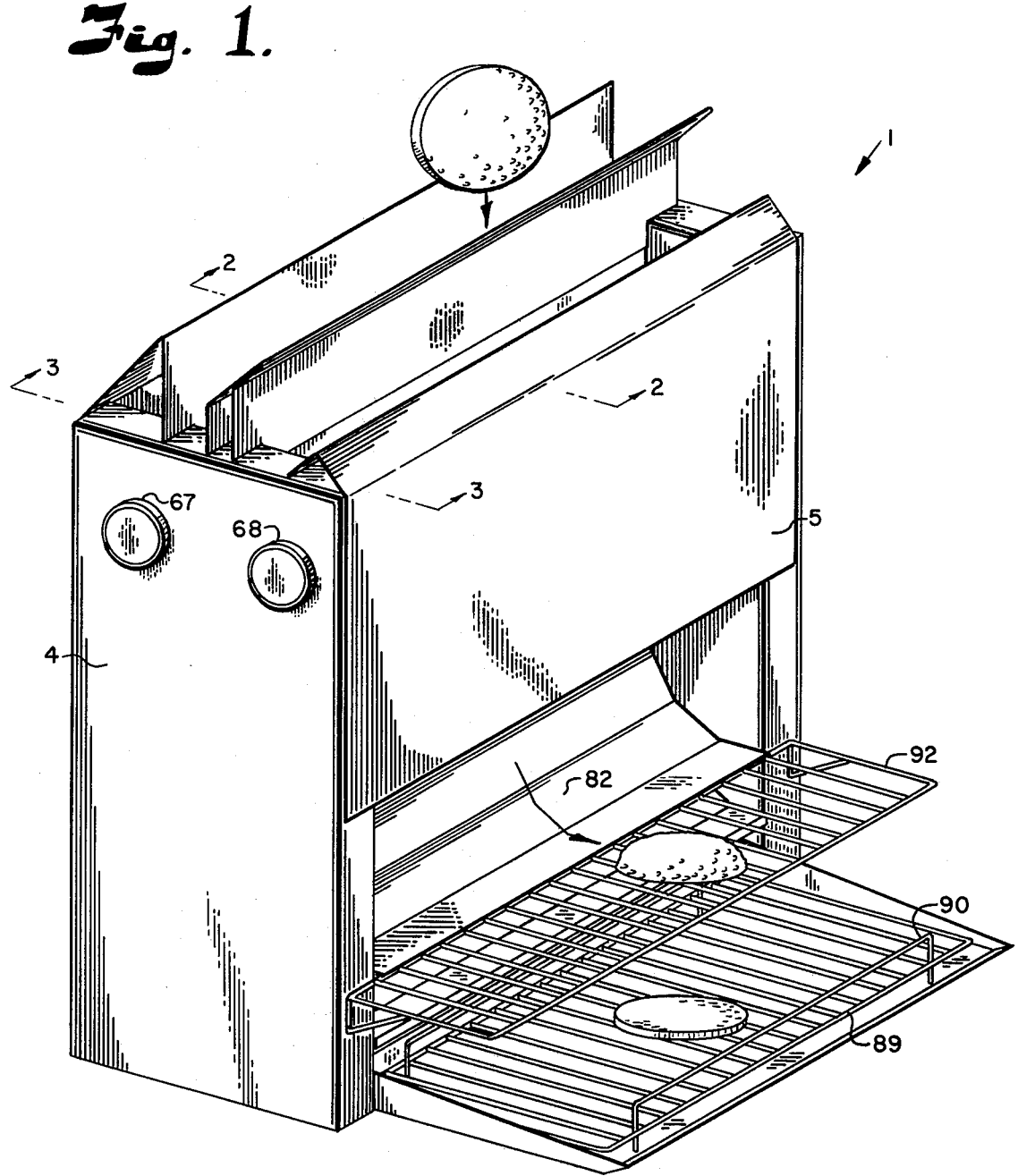
FIG. 1 is perspective view of a toasting apparatus.

The reference numeral 1 designates generally a toasting or cooking apparatus adapted for simultaneously toasting, searing, browning or otherwise cooking food products such as a sandwich bun 2. The apparatus 1 includes a housing 3 which in the illustrated form is comprised of a plurality of exterior panels 4, 5, 6 and 7. For manufacturing convenience these panels may be single piece or multiple piece panels.

Mounted inside the housing 4 is a heating platen 10 which has two generally oppositely facing heating surfaces 11 and 12. The heating platen can be of any suitable type and preferably the surfaces 11 and 12 are continuous, smooth and can be coated with a non-stick material, such as Teflon, chrome plating or the like. The platen 10 contains heating elements which can be either electrical resistance type, gas burners or any other suitable heating device. In one preferred form of the invention, electrical heating type heaters are used in the platen 10. It is preferred that the surfaces be continuous and smooth to ensure that a bun half or the like can be positively conveyed over the surface in a given time period so as to not overcook or undercook the bun half. In a preferred form of the invention, the platen 10 is disposed generally vertically. However, it is to be understood that the apparatus as illustrated can also be dipsosed generally horizontally and still be operable. The vertical disposition of the apparatus 1 is desired in order to minimize the amount of counter space required.

A pair of conveying means is suitably mounted within the housing 1 and each are operable for moving a respective bun half from a feed opening 14 past the heating platen 10 to a discharge 15. Any suitable conveying means can be utilized. In the illustrated structure, two conveying means 17 and 18 are positioned within the housing 1. The conveying means 17 and 18 as illustrated, are substantially identical with the exception of the direction which they face and their location within the housing 3. The conveying means 17 and 18 each include a conveying belt 19 which in the illustrated structure is in the form of a link belt comprised of a plurality of spaced apart rods or bars 20. The belts 19 are each entrained over upper sprockets 21, one at each end of the belt, and lower sprockets 22, one at each end of the belt. The sprockets 21 and 22 are mounted on respective shafts 23 and 24 to effect simultaneous movement thereto. One shaft 24 is rotatably mounted in the arm 25 and the other shaft 24 is rotatably mounted in the arm 26. The arms 25 and 26 each have one end pivoted as at 27 for a purpose later described. On a free end of each of the shafts 24 there is secured a respective sprocket 28.

The sprockets 28 are in turn operably connected to a drive motor 30 which is suitably mounted in the housing 3. Preferably, the connection is by a link chain 31 which is engaged with a sprocket 32 which is mounted on the drive shaft of the motor 30. A series of stationary idler sprockets 33 are rotatably mounted on one panel 34 of the housing 3 and are used to properly position the chain 31 in relation to the pullies 28 to assure driving engagement. A spring loaded idler sprocket 35 is also engaged with the chain 31 to maintain tension therein. The idler sprocket 35 is mounted on an arm 36 which in turn is pivotly mounted on the panel 34. A spring 37 has one end connected to an eye-bolt 38 or the like and arm 36. The eye-bolt 38 is secured to the panel 34. By driving the sprockets 28, the shafts 24 will turn and by virtue of the respective sprockets 21 and 22 being connected together by the respective belt 19, they will also turn. The motor 30 can be provided with a slip clutch 40 to prevent overloading of the motor 30.

A respective pair of shafts 23 and 24 are rotatably mounted in two spaced apart arms or links 42 which maintains the shafts in spaced apart relationship. As illustrated, a surface 43 of the link 42 can be in engagement with one run of the belt 19 to maintain travel of the belt 19 in one or more predetermined planes. The surfaces 43 also provide support for the respective belt 19 to ensure proper movement of a bun half through the apparatus 1. The belts 19 each have a respective conveying surface 45 defined by the outer surface portion of each of the bars 20 with the surface 45 being generally parallel to the respective surface 11 or 12 of the heating platen and preferably being generally parallel thereto. Each surface 45 and the respective surface 11 or 12 define a path 46 and 47 respectively for movement of a bun half through the apparatus 1 in the area of the heating platen 10. The surface 11 and respective surface 45 and the surface 12 and respective surface 45 face in generally opposite directions or toward each other. The paths 46 and 47 are generally parallel and are in spaced apart relationship.

Means is provided for defining the feed opening 14. In the illustrated structure a panel 50 is positioned above the conveying means 17 and has a surface 51 which is preferably generally parallel to the surface 11 and respective surface 45 and faces in a direction generally opposite to the surface 11 and generally in the same direction as the respective surface 45. A panel 52 is positioned above the conveying means 18 and has a surface 53 which is generally parallel to the respective surface 45 and the surface 12 and faces in a direction generally opposite to the surface 12 and generally in the same direction as the respective surface 45. In the illustrated structure the panel 50 is a portion of the panel 7 and the panel 52 is a portion of the panel 5. It is to be noted that the interior of the panels 5 and 7 and the other panels of the apparatus can have an insulating coating applied thereto to reduce the exterior temperature of the apparatus 1.

In a preferred form of the present invention, the feed opening 14 is divided into two openings 54 and 55 by a panel member 56. To facilitate operation of the apparatus, the panel 56 is comprised of a first panel portion 57 and a second panel portion 58, each positioned on the outside of the heating member 10 to eliminate any edges or lips which might retard entry of a bun half into the respective path 46 or 47. Preferably, the panel 57 has an outwardly facing surface which is generally parallel to the surface 11 and faces generally in the same direction as the surface 11. The panel 58 has an outwardly facing surface which is preferably generally parallel to the surface 12 and faces generally in the same direction as the surface 12. The panel 56 has an upper free edge 64 which is preferably thin to facilitate separating of the bun 2 into its respective two halves, commonly referred to as the heel 60 and the crown 61. The bun 2 when separated has two inner surfaces 62 and 63 which are the desired surfaces to be toasted or browned. The upper edge 64 is preferably formed at the juncture between two panel portions 65 and 66 which preferably are inclined at an angle relative to teh panels 57 and 58 such that the incline is upwardly and toward the front of the apparatus 1. This facilitates operation by a worker. The worker need only grasp a bun 2 and force the edge 64 into the cut in the bun 2 and by pushing the bun downwardly will separate the bun 2 into its crown portion 61 and heel portion 60 and gravity will then urge the bun halves to move downwardly into the respective paths 46 and 47. By separating a bun in the above-described manner, the respective surfaces 63 and 64 will be facing the respective heating surfaces 12 and 11. Preferably the spacing of the surfaces 45 from the respective surfaces 11 and 12 are such that the surfaces 64 and 63 of the bun will be in contact with the heating platen during travel along the respective paths 46 and 47.

Figure 4:
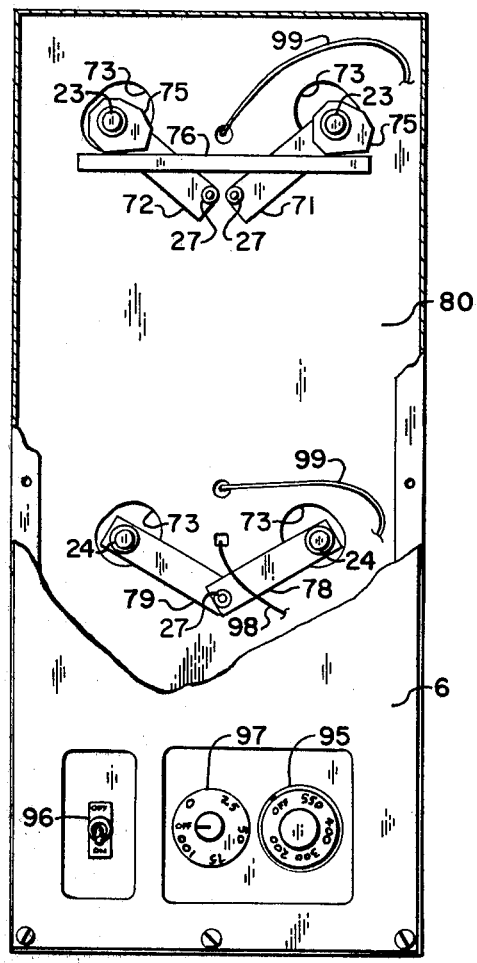
FIG. 4 is a fragmentary view of one end of the apparatus of FIG. 1 as viewed from the right-hand end of the apparatus as viewed in FIG. 1.

The apparatus 1 is provided with means for adjusting the spacing between the surfaces 45 and the respective surfaces 11 and 12 in order to accommodate different bun sizes or different types of bread products. In the illustrated structure, the adjusting means includes two knobs 67 and 68 extending outwardly from an end panel 4 of the housing 3. As best seen in FIG. 3, the knobs 67 and 68 are mounted on respective shafts 23 of a respective conveying means 17 and 18. The shafts 23 are in turn mounted on respective arms 69 and 70, as seen in FIG. 3. The other end of each shaft 23 is mounted on a respective arm 71 and 72 as seen in FIG. 4. The arms 69, 70, 71 and 72 are each pivotly mounted on a respective panel 34 or 80 of the housing 3. The shafts 23 extend through openings 73 to permit movement. Secured to each shaft 23 there is a respective cam 75. The securement is such that the cam 75 will not rotate relative to the respective shaft 23. Each of the cams 75 is provided with a plurality of flat surface portions around the periphery. These flat surface portions will rest on a respective cam support member 76 which are each in turn suitably secured to a respective panel 34 or 80 of the housing 3. By rotation of the knobs 67 and 68, either individually or together, the cams 75 will rotate and change the position of the respective shaft 23 to move the respective conveyor 17 or 18 toward or away from the heating platen 10.

As seen in FIGS. 3 and 4, the shafts 24 are also each mounted on a respective arm 25 or 26 which as described above are each pivotly mounted on the panel 34. The opposite ends of the shafts 24 are also mounted on similar arms 78 and 79 which in turn are pivotly mounted on the panel 80. Because the shafts 23 and 24 of each of the conveying means 17 and 18 are connected by the links 42, movement of the shafts 23 as described above will effect similar movement of the shafts 24. Thus, after movement, the surfaces 45 will still be in a generally parallel disposition relative to the respective surface 11 or 12.

The apparatus 1 is provided with discharge means for allowing discharge of a toasted food product from the paths 46 and 47. As illustrated, the discharge means is such that the toasted surfaces 62 and 63 will be facing one another when the crown 61 and heel 60 are discharged. In the illustrated structure, a somewhat arcuate panel 82 separates the discharge 15 into two discharge paths 84 and 85, each opening into a respective path 46 or 47. The path 84 opens into the path 46 while the path 85 opens into the path 47. The path 84 is further defined by another panel which is somewhat arcuate with the panel 86 extending across the width of the apparatus 1 as does the panel 82. The spacing between the panels 82 and 86 is sufficient to allow free movement of the food product through the path 84. The path 85 does not need a second panel for defining.

In front of the apparatus 1 there is provided a first member 88 secured to the panel 4 and 6 on which one-half of the bun will be deposited from the path 84. The member 88 can be a grill-like member comprised of a plurality of secured together and spaced apart rods 89. Preferably at the front end of the member 88 there is provided a stop member 90. In operaton, a toasted bun heel will be discharged through the path 84 and onto the member 88 with the toasted surface facing upwardly.

A second member 91 is positioned at the front of the apparatus 1, and is secured to the panels 4 and 6. The member 91 can be similar in construction to the member 88 by being comprised of a plurality of secured together and spaced apart rods 92. The member 91 is positioned such that a bun half being discharged from the path 47 through the path 85 will be discharged thereonto with the toasted surface facing down. Thus, it can be seen that the bun after grilling has the surfaces which were mating surfaces 63 and 64 facing one another so that an operator can easily insert the sandwich material on the upwardly facing surface 64 and will not be required to reorient the other half in order to assemble a sandwich.

As best seen in FIG. 4, the apparatus 1 can be provided with a temperature controller 95. It can also be provided with an on/off switch 96. The operating speed of the apparatus 1 can be controlled by a suitable motor speed controller 97. The temperature controller 95 can be operably connected to the power source and a thermocouple 98 can control the current supplied to the heating platen 10 via power cords 99.

It is to be understood that while there has been illustrated and described certain forms of the present invention, it is not to be limited to the specific form or arrangement of parts herein described and shown, except to the extent that such limitations are found in the claims.

What is claimed and desired to be secured by letters patent is:

1. A cooking device including:
    a housing,
    a heating platen in said housing, said heating platen having a first heating surface and a second heating surface with said first and second heating surfaces facing generally in opposite directions;
    first conveying means mounted in said housing and positioned on one side of said heating platen and having a first portion thereof spaced from and generally parallel to the first heating surface, said first portion and said first heating surface defining a first path therebetween along which a bun portion can move for toasting;
    second conveying means mounted in said housing and positioned on the other side of said heating platen and having a second portion thereof spaced from and generally parallel to the second heating surface, said second portion and said second heating surface defining a second path therebetween along which a bun portion can move for toasting;
    first means associated with said housing and defining at least one feed opening into each of said first and second paths, said first means including: a first panel positioned adjacent an end of the first conveying means adjacent the feed opening, said first panel having a first face facing in a direction generally opposite to the direction the first heating surface faces; a second panel positioned adjacent an end of the second conveying means adjacent the feed opening, said second panel having a second face facing in a direction generally opposite to the direction the second heating surface faces; said first and second panel being generally parallel with but spaced from said first and second heating surfaces to form said feed openings, and a third panel positioned generally above said platen and between said first and second panel thereby forming two feed openings, said third panel being positioned adjacent to an end of the heating platen adjacent the feed opening, said third panel having a third face facing generally in the same direction as the first heating surface, said third panel having a fourth face facing generally in the same direction as the second heating surface, said third panel has a free edge spaced from the heating platen which is adapted for separating a bun into a heel portion and a crown portion whereby the heel portion will travel through the first path or second path and the crown portion will travel through the other of the first path or second path with the inside surfaces of the heel portion and crown portion facing the respective heating surface;
    second means with said housing and defining a first discharge path opening into said first path;
    third means associated with said housing and defining a second discharge path opening into said second path;
    a first member positioned adjacent said first discharge path and operable for receiving and supporting a bun portion thereon after discharge from the first path; and
    a second member positioned adjacent said second discharge path and operable for receiving and supporting a bun portion thereon after discharge from the second party, said second member being positioned above said first member.

2. A cooking device as set forth in claim 1 including adjusting means operably connected to said first and second conveying means for adjusting the spacing between the first portion and the first heating surface and the spacing between the second portion and the second heating suface.

3. A cooking device as set forth in claim 1 wherein said first and second portions and said first and second heating surfaces are disposed generally vertical; and
    said first and second members are disposed generally horizontally.

4. A cooking device as set forth in claim 1 wherein said third panel has a first portion disposed generally parallel to the heating platen and a second portion extending from the first portion and being disposed at an angle from the third panel first portion, said third panel second portion having said free edge.

5. A cooking device as set forth in claim 1 wherein:

said first conveying means includes a first endless belt conveyor;

said second conveying means includes a second endless belt conveyor; and said first and second conveying means includes a motor operably connected to the first and second endless belt conveyors.

* * * * *